(12) United States Patent
Mise

(10) Patent No.: US 9,727,065 B2
(45) Date of Patent: Aug. 8, 2017

(54) APPARATUS CONTROL DEVICE, APPARATUS CONTROL SYSTEM, AND PROGRAM FOR UPDATING APPARATUS CONTROL CONTENT BASED ON A SKIN TEMPERATURE

(71) Applicant: Panasonic Corporation, Osaka (JP)

(72) Inventor: Atsushi Mise, Aichi (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 540 days.

(21) Appl. No.: 14/388,002

(22) PCT Filed: Feb. 25, 2013

(86) PCT No.: PCT/JP2013/001061
§ 371 (c)(1),
(2) Date: Sep. 25, 2014

(87) PCT Pub. No.: WO2013/145544
PCT Pub. Date: Oct. 3, 2013

(65) Prior Publication Data
US 2015/0088316 A1    Mar. 26, 2015

(30) Foreign Application Priority Data

Mar. 29, 2012 (JP) ................................ 2012-076395

(51) Int. Cl.
*G01M 1/38* (2006.01)
*G05D 23/19* (2006.01)
(Continued)

(52) U.S. Cl.
CPC ........ *G05D 23/1917* (2013.01); *F24F 11/006* (2013.01); *F24F 11/0012* (2013.01); *F24F 2011/0058* (2013.01); *G01J 5/0022* (2013.01)

(58) Field of Classification Search
None
See application file for complete search history.

(56) References Cited

U.S. PATENT DOCUMENTS 5,145,112 A    9/1992  Ueda
5,172,856 A *  12/1992 Tanaka ................... G05D 23/27
                                                      236/49.3
(Continued)

FOREIGN PATENT DOCUMENTS

JP    62-125243 A    6/1987
JP    04-148142 A    5/1992
(Continued)

OTHER PUBLICATIONS

Extended European Search Report for corresponding European Application No. 13767534.4 dated Jun. 2, 2015.
(Continued)

*Primary Examiner* — Adam Lee
(74) *Attorney, Agent, or Firm* — Renner, Otto, Boisselle & Sklar, LLP

(57) ABSTRACT

An apparatus control system includes a skin temperature measurement device configured to measure a skin temperature, and an apparatus control device that controls a heating-cooling combination apparatus. In the apparatus control device, a storage unit stores a correspondence table (correspondence relationship) between skin temperatures and control contents of the heating-cooling combination apparatus. The apparatus control unit controls the heating-cooling combination apparatus according to a control content stored in the storage unit in association with a first skin temperature that is inputted to an input unit. Thereafter, if a second skin temperature that is newly inputted to the input unit is not included in a comfortable temperature range, the update unit updates the correspondence table stored in the storage unit. In this case, the update unit changes the control content in (Continued)

the correspondence table such that over-control or under-control according to the control content is reduced.

20 Claims, 4 Drawing Sheets

(51) Int. Cl.
*F24F 11/00* (2006.01)
*G01J 5/00* (2006.01)

(56) References Cited

U.S. PATENT DOCUMENTS

| | | | |
|---|---|---|---|
| 5,762,265 A | 6/1998 | Kitamura et al. | |
| 5,944,256 A * | 8/1999 | Arai | B60H 1/00735 236/49.3 |
| 6,443,885 B1 * | 9/2002 | Schuler | A61G 11/00 600/22 |
| 2003/0069714 A1 * | 4/2003 | Wigley | A61B 5/01 702/131 |
| 2003/0197003 A1 * | 10/2003 | Kneuer | A61G 11/00 219/494 |
| 2004/0162549 A1 * | 8/2004 | Altshuler | A61B 18/203 606/9 |
| 2008/0114495 A1 | 5/2008 | Suyama et al. | |
| 2008/0243027 A1 * | 10/2008 | Nakayama | A61B 5/01 600/549 |
| 2008/0295531 A1 * | 12/2008 | Song | F24F 11/006 62/157 |
| 2009/0033482 A1 * | 2/2009 | Hayter | G06F 19/3412 340/501 |
| 2009/0036747 A1 * | 2/2009 | Hayter | A61B 5/01 600/300 |
| 2009/0234200 A1 * | 9/2009 | Husheer | A61B 5/0008 600/301 |
| 2010/0094385 A1 * | 4/2010 | Hendriks | A61N 5/06 607/100 |
| 2012/0010477 A1 * | 1/2012 | Amano | A61B 5/0075 600/301 |
| 2012/0072044 A1 * | 3/2012 | Slaby | G01K 13/00 700/299 |
| 2013/0255930 A1 * | 10/2013 | Prakah-Asante | B60H 1/00807 165/203 |

FOREIGN PATENT DOCUMENTS

| | | |
|---|---|---|
| JP | 05-27537 U | 4/1993 |
| JP | 09-105545 A | 4/1997 |
| JP | 2000-104972 A | 4/2000 |
| JP | 2007-198653 A | 8/2007 |
| JP | 2008-241135 A | 10/2008 |
| JP | 2009-043046 A | 2/2009 |
| JP | 2009-047324 A | 3/2009 |
| JP | 2011-202892 A | 10/2011 |

OTHER PUBLICATIONS

International Search Report for corresponding International Application No. PCT/JP2013/001061 mailed May 14, 2014.
Form PCT/ISA/237 for corresponding International Application No. PCT/JP2013/001061 dated May 14, 2014.

* cited by examiner

APPARATUS CONTROL DEVICE, APPARATUS CONTROL SYSTEM, AND PROGRAM FOR UPDATING APPARATUS CONTROL CONTENT BASED ON A SKIN TEMPERATURE

TECHNICAL FIELD

The present invention relates to an apparatus control device, an apparatus control system, and a program for controlling a heating-cooling combination apparatus.

BACKGROUND ART

Heretofore, when the thermal environment of a predetermined indoor space is not comfortable, the user of an air-conditioning apparatus changes the set temperature of the air-conditioning apparatus by operating a remote controller. In this case, the intention of the user can be directly reflected in the control of the air-conditioning apparatus.

However, there are users who will not operate the remote controller because operating the remote controller is troublesome, even though the thermal environment of the indoor space is not comfortable.

In view of this, as a means to make operating the remote controller unnecessary when controlling an air-conditioning apparatus, a control device disclosed in JP 2000-104972A (hereinafter referred to as "Document 1") estimates the thermal sensation of the user using the skin temperature of the user, and determines the set temperature of the air-conditioning apparatus by substituting the estimated value of the thermal sensation into a numerical formula.

Incidentally, preferences for the thermal environment differ from person to person. That is, some people prefer a warmer environment and some people prefer a cooler environment.

However, in the conventional control device described in Document 1, since the correspondence relationship between the skin temperature and the set temperature of the air-conditioning apparatus is fixed, the preference of the user cannot be reflected in the control of the air-conditioning apparatus.

SUMMARY OF INVENTION

The present invention has been made in view of the above-described problems, and an object of the present invention is to provide an apparatus control device, an apparatus control system, and a program, in which it is possible to reflect a preference of a user in the control of an heating-cooling combination apparatus while making remote controller operation by the user unnecessary.

An apparatus control device according to the present invention is configured to control a heating-cooling combination apparatus and used together with a skin temperature measurement device configured to measure a skin temperature. The apparatus control device includes a storage unit, an input unit, an apparatus control unit, and an update unit. The storage unit is configured to store a correspondence relationship between skin temperatures and control contents of the heating-cooling combination apparatus. The input unit is configured to receive input of the skin temperature measured by the skin temperature measurement device. The apparatus control unit is configured to control the heating-cooling combination apparatus according to a control content stored in the storage unit in association with a first skin temperature that is inputted to the input unit. The update unit is configured to update the correspondence relationship stored in the storage unit. When a second skin temperature that is newly inputted to the input unit after the apparatus control unit has controlled the heating-cooling combination apparatus according to the control content is not included in a predetermined comfortable temperature range, the update unit changes the control content in the correspondence relationship stored in the storage unit such that over-control or under-control according to the control content is reduced.

Preferably, the apparatus control device further includes an acquisition unit. The acquisition is configured to acquire the correspondence relationship that is to be initially stored in the storage unit from a server in which a plurality of the correspondence relationships are stored.

Preferably, the apparatus control device further includes a recognition unit. The recognition is configured to recognize a type of user, out of a plurality of predetermined types relating to thermal sensation. The server is configured to store the correspondence relationships by type. The acquisition unit is configured to acquire the correspondence relationship corresponding to the type recognized by the recognition unit from the server.

Preferably, in the apparatus control device, the storage unit is configured to store the correspondence relationship for each weather condition.

Preferably, in the apparatus control device, the control content is a control width designating a temperature width that is to be added to or subtracted from a set temperature of the heating-cooling combination apparatus. The update unit increases the control width associated with the first skin temperature in the correspondence relationship to a greater width than before, when the second skin temperature is higher than an upper limit value of the comfortable temperature range after the apparatus control unit has controlled the heating-cooling combination apparatus so as to lower the set temperature. The update unit decreases the control width associated with the first skin temperature in the correspondence relationship to a lesser width than before, when the second skin temperature is lower than a lower limit value of the comfortable temperature range after the apparatus control unit has controlled the heating-cooling combination apparatus so as to lower the set temperature. The update increases the control width associated with the first skin temperature in the correspondence relationship to a greater width than before, when the second skin temperature is lower than the lower limit value of the comfortable temperature range after the apparatus control unit has controlled the heating-cooling combination apparatus so as to raise the set temperature. The update decreases the control width associated with the first skin temperature in the correspondence relationship to a lesser width than before, when the second skin temperature is higher than the upper limit value of the comfortable temperature range after the apparatus control unit has controlled the heating-cooling combination apparatus so as to raise the set temperature.

An apparatus control system according to the present invention includes the apparatus control device and the skin temperature measurement device. The skin temperature measurement device is configured to measure a skin temperature.

Preferably, in the apparatus control system, the skin temperature measurement device is provided in a terminal separate from the apparatus control device.

A program according to the present invention is a program for causing a computer to function as a storage unit, an input unit, an apparatus control unit, and an update unit. The storage unit is configured to store a correspondence relationship between skin temperatures and control contents of a heating-cooling combination apparatus. The input unit is configured to receive input of a skin temperature measured by a skin temperature measurement device. The apparatus control unit is configured to control the heating-cooling combination apparatus according to a control content stored in the storage unit in association with a first skin temperature that is inputted to the input unit. The update unit is configured to update the correspondence relationship by changing the control content in the correspondence relationship stored in the storage unit such that over-control or under-control according to the control content is reduced, when a second skin temperature that is newly inputted to the input unit after the apparatus control unit has controlled the heating-cooling combination apparatus according to the control content is not included in a predetermined comfortable temperature range. The present invention is not limited to the program, and may be a computer-readable recording medium in which the above program is recorded.

According to the apparatus control device, the apparatus control system, and the program of the present invention, it is possible to change the control content in the correspondence relationship stored in the storage unit such that over-control or under-control according to the control content is reduced after the heating-cooling combination apparatus has been controlled according to the control content. Therefore, it is possible to reflect the preference of a user in the control of the heating-cooling combination apparatus while making remote controller operation by the user unnecessary.

BRIEF DESCRIPTION OF DRAWINGS

Preferred embodiments of the present invention will now be described in further details. Other features and advantages of the present invention will become better understood with regard to the following detailed description and accompanying drawings where.

DESCRIPTION OF EMBODIMENTS

Figure 1:
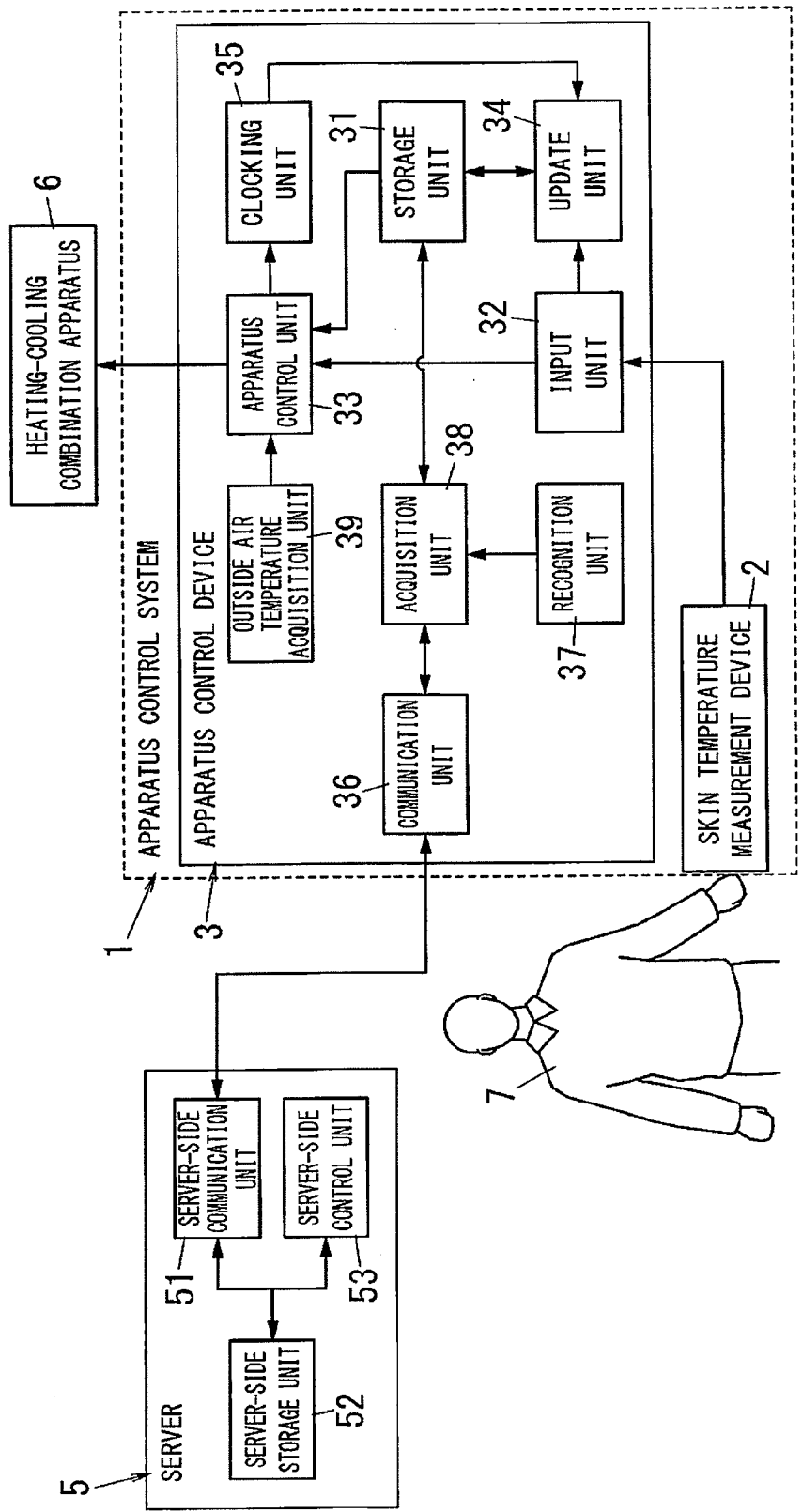
FIG. 1 is a block diagram illustrating a configuration of an apparatus control system according to an embodiment.

An apparatus control system 1 according to the present embodiment includes, as shown in FIG. 1, a skin temperature measurement device 2 that is configured to measure a skin temperature, and an apparatus control device 3 that is configured to control a heating-cooling combination apparatus 6 using a first skin temperature measured by the skin temperature measurement device 2.

In the apparatus control system 1 of the present embodiment, the apparatus control device 3 is configured to refer to a correspondence relationship in which skin temperatures are associated with control contents of the heating-cooling combination apparatus 6, and control the heating-cooling combination apparatus 6 according to the control content associated with the first skin temperature of the user 7 of the heating-cooling combination apparatus 6. Thereafter, if the second skin temperature that is newly inputted is not included in a comfortable temperature range, the apparatus control device 3 changes the above control content in the correspondence relationship such that over-control or under-control according to the above control content is reduced. Hereinafter, the constituent elements of the apparatus control system 1 will be described.

The heating-cooling combination apparatus 6 of the present embodiment is a collective term that refers to an apparatus that includes both a cooling function and a heating function, a cooling apparatus that includes only a cooling function, and a heating apparatus that includes only a heating function. The apparatus that includes both the cooling function and the heating function is a heating-cooling combination air-conditioner, for example. The cooling apparatus that includes only the cooling function is a cooling air-conditioner, for example. The heating apparatus that includes only the heating function is a floor heating apparatus or a fan heater, for example. The heating-cooling combination apparatus 6 is configured to control the thermal environment of an unshown predetermined indoor space.

The skin temperature measurement device 2 is provided separately from the apparatus control device 3. The skin temperature measurement device 2 is configured to measure the skin temperature of a user 7 of the heating-cooling combination apparatus 6, and output the measurement result to the apparatus control device 3. Examples of method of measuring the skin temperature include a contactless type method in which the skin temperature is measured by infrared thermography, and a contact type method in which a thermistor is attached to the skin.

The apparatus control device 3 is a device that is configured to convert the skin temperature measured by the skin temperature measurement device 2 to the control content of the heating-cooling combination apparatus 6, and instructs operations of the heating-cooling combination apparatus 6. The apparatus control device 3 includes a computer (including a microcomputer) in which a CPU (Central Processing Unit) and a memory are incorporated as the main constituent elements, and is configured to execute the functions of a storage unit 31, an input unit 32, an apparatus control unit 33, and an update unit 34, by operating according to the program.

Figure 2:
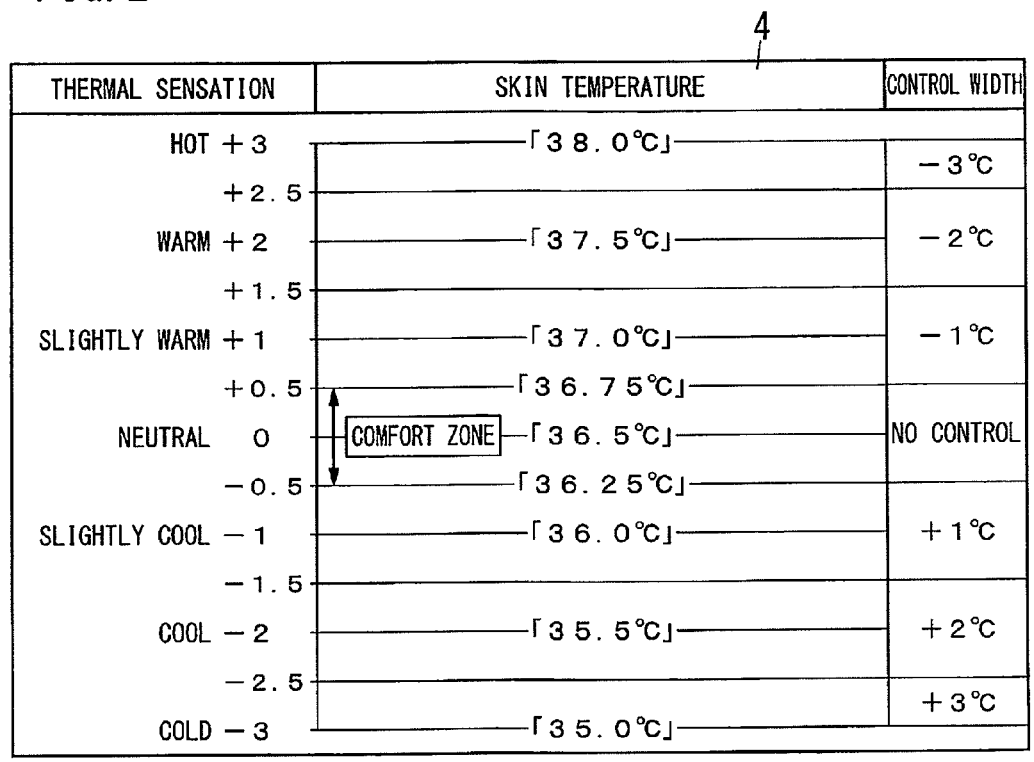
FIG. 2 is a diagram illustrating a correspondence table according to the embodiment.

The storage unit 31 pre-stores, as a correspondence table 4, a correspondence relationship between skin temperatures and control contents of the heating-cooling combination apparatus 6, as shown in FIG. 2. In the present embodiment, a control width that indicates a temperature width to be added to or subtracted from the current set temperature is set as the control content of the heating-cooling combination apparatus 6.

The correspondence table 4 shown in FIG. 2 is configured by combining the following tables: a first table in which thermal sensations are associated with skin temperatures; and a second table in which the thermal sensations are associated with control contents. A seven-point scale defined by the international standards ISO 7730 of the International Organization for Standardization (ISO) is used as the thermal sensation in the correspondence table 4. The larger the number of the thermal sensation is, the hotter the user 7 feels. On the other hand, the smaller the number of the thermal sensation is, the colder the user 7 feels. A thermal sensation of "0" is the level at which the user feels neither hot nor cold. In many cases, thermal sensations between "+0.5" and "−0.5" are generally defined as the comfort zone in which the user 7 feels comfortable.

The skin temperatures are associated with thermal sensations in the first table. The thermal sensation of "0" is associated with the skin temperature of the user 7 when the user 7 feels neither hot nor cold. In a case where the skin temperature is 36.5° C. when the thermal sensation is 0, for example, the thermal sensation takes a positive number when the skin temperature is higher than 36.5° C. When the skin temperature of the user 7 is "37.5° C.", for example, the thermal sensation of the user 7 is "+2". On the other hand, the thermal sensation takes a negative number when the skin temperature is lower than 36.5° C. When the skin temperature of the user 7 is "36.0° C.", for example, the thermal sensation of the user 7 is "−1".

Note that, the skin temperature that is associated with the thermal sensation of "0" may be set by an input by the user 7, or may be automatically set by the skin temperature measurement device 2. In a case where the skin temperature is automatically set by the skin temperature measurement device 2, the skin temperature having the highest occurrence frequency during a learning period is automatically set so as to be associated with the thermal sensation of "0", the learning period being, for example, the spring or the fall when the user 7 does not use the heating-cooling combination apparatus 6. The reference of the thermal sensation can thereby be set for each user 7.

The thermal sensation is divided into a plurality of ranges in the second table, and a different control width is set for each range. In a case where the thermal sensation is a positive number, the larger the thermal sensation is, the larger the decrement width of the set temperature is. For example, the control width when the thermal sensation is "+2" is "−2° C.". On the other hand, in a case where the thermal sensation is a negative number, the lower the thermal sensation is, the larger the increment width of the set temperature is. For example, when the thermal sensation is "−1", the control width is "+1° C.".

As described above, in the correspondence table 4, the skin temperature of "37.5° C." is associated with the thermal sensation of "+2" in the first table, and the thermal sensation of "+2" is associated with the control width of "−2° C." in the second table. Accordingly, the skin temperature of "37.5° C." is associated with the control width of "−2° C.". Similarly, the skin temperature of "36.0° C." is associated with the thermal sensation of "−1", and the thermal sensation of "−1" is associated with the control width of "+1° C.". Accordingly, the skin temperature of "36.0° C." is associated with the control width of "+1° C.".

The input unit 32 shown in FIG. 1 is coupled to the output side of the skin temperature measurement device 2, and is configured to receive a measurement result of the skin temperature measurement device 2 from the coupled skin temperature measurement device 2.

The apparatus control unit 33 is configured to check the first skin temperature included in the measurement result that is inputted to the input unit 32 against the correspondence table 4 (refer to FIG. 2) stored in the storage unit 31, and extract the control content associated with the first skin temperature from the correspondence table 4. For example, in a case where a skin temperature of "37.5° C." is included in the measurement result as the first skin temperature, the apparatus control unit 33 extracts the control width of "−2° C." from the correspondence table 4 as the control content.

The apparatus control unit 33 that has extracted the control content from the correspondence table 4 is configured to generate a control signal so as to operate the heating-cooling combination apparatus 6 according to the control content, and output the generated control signal to the heating-cooling combination apparatus 6. The apparatus control unit 33 can thereby control the heating-cooling combination apparatus 6 according to the control content extracted from the correspondence table 4. In a case where the current set temperature is 27° C. and the first skin temperature is 37.5° C., for example, the apparatus control unit 33 extracts a control width of "−2° C." as the control content from the correspondence table 4, and outputs a control signal for a set temperature of "25° C." to the heating-cooling combination apparatus 6. The heating-cooling combination apparatus 6, upon receiving the control signal from the apparatus control unit 33, changes the set temperature from 27° C. to 25° C. according to the received control signal.

As described above, the apparatus control device 3 can change the set temperature of the heating-cooling combination apparatus 6 depending on the first skin temperature of the user 7. Note that, when the first skin temperature of the user 7 is in a range from the skin temperature associated with the thermal sensation of "+0.5" to the skin temperature associated with the thermal sensation of "−0.5", the apparatus control device 3 does not control the heating-cooling combination apparatus 6.

Incidentally, even in a case where the apparatus control device 3 has changed the set temperature of the heating-cooling combination apparatus 6 depending on the first skin temperature of the user 7, the thermal environment may not match the preference of the users 7 who are in the indoor space, due to the preference regarding the thermal environment being different from person to person. For example, even in a case where the apparatus control device 3 has controlled the heating-cooling combination apparatus 6 so as to lower the set temperature of the heating-cooling combination apparatus 6 by "2° C." in response to a first skin temperature of "37.5° C.", there may be a person who still feels hot or a person who feels cold. Similarly, even in a case where the apparatus control device 3 has controlled the heating-cooling combination apparatus 6 so as to raise the set temperature of the heating-cooling combination apparatus 6 by "1° C." in response to a first skin temperature of "36.0° C.", there may be a person who still feels cold or a person who feels hot.

In view of this, the apparatus control device 3 includes a function for updating the correspondence table 4 (refer to FIG. 2) stored in the storage unit 31. If the second skin temperature included in the measurement result that is newly inputted to the input unit 32 after the apparatus control unit 33 has controlled the heating-cooling combination apparatus 6 according to the control content is not included in the comfortable temperature range, the update unit 34 is configured to change the above control content of the correspondence table 4 stored in the storage unit 31.

The update unit 34 changes the above control content in the correspondence table 4 stored in the storage unit 31 such that over-control or under-control according to the above control content is reduced. In the present embodiment, the update unit 34 updates the first table, in the correspondence table 4, in which the thermal sensations are associated with the skin temperatures (first skin temperatures). In this case, the second table in which the thermal sensations are associated with the control widths (control contents) is not changed. Note that it is preferable that the update unit 34 updates the correspondence table 4 if the second skin temperature that is inputted in a predetermined time slot is not included in the comfortable temperature range after the apparatus control unit 33 has controlled the heating-cooling combination apparatus 6 according to the control content. In this case, a clocking unit 35 may clock the time slot. The clocking unit 35 may start clocking the time slot from when the apparatus control unit 33 controlled the heating-cooling combination apparatus 6 according to the control content, or may start clocking the time slot from when a predetermined time has passed since the apparatus control unit 33 controlled the heating-cooling combination apparatus 6 according to the control content.

Over-control or under-control according to the control content occurs in the following cases: (1) a case where the user 7 still feels hot, after a control for lowering the set temperature has been performed; (2) a case where the user 7 feels cold, after a control for lowering the set temperature has been performed; (3) a case where the user 7 still feels cold, after a control for raising the set temperature has been performed; and (4) a case where the user 7 feels hot, after a control for raising the set temperature has been performed.

The update contents of the control width corresponding to the first skin temperature differs from each other according to the cases (1) to (4) described above.

In case (1), that is to say, if the second skin temperature is higher than the upper limit value of the comfortable temperature range after the apparatus control unit 33 has controlled the heating-cooling combination apparatus 6 so as to lower the set temperature, the update unit 34 increases the value of the thermal sensation that is associated with the first skin temperature in the correspondence table 4 to a greater value than before. The update unit 34 can thereby increase the control width (decrement width) corresponding to the first skin temperature in the correspondence table 4 to a greater width than before.

In case (2), that is to say, if the second skin temperature is lower than the lower limit value of the comfortable temperature range after the apparatus control unit 33 has controlled the heating-cooling combination apparatus 6 so as to lower the set temperature, the update unit 34 decreases the value of the thermal sensation that is associated with the first skin temperature in the correspondence table 4 to a lesser value than before. The update unit 34 can thereby decrease the control width (decrement width) corresponding to the first skin temperature in the correspondence table 4 to a lesser width than before.

In case (3), that is to say, if the second skin temperature is lower than the lower limit value of the comfortable temperature range after the apparatus control unit 33 has controlled the heating-cooling combination apparatus 6 so as to raise the set temperature, the update unit 34 decreases the value of the thermal sensation that is associated with the first skin temperature in the correspondence table 4 to a lesser value than before. The update unit 34 can thereby increase the control width (increment width) corresponding to the first skin temperature in the correspondence table 4 to a greater width than before.

In case (4), that is to say, if the second skin temperature is higher than the upper limit value of the comfortable temperature range after the apparatus control unit 33 has controlled the heating-cooling combination apparatus 6 so as to raise the set temperature, the update unit 34 increases the value of the thermal sensation that is associated with the first skin temperature in the correspondence table 4 to a greater value than before. The update unit 34 can thereby decrease the control width (increment width) corresponding to the first skin temperature in the correspondence table 4 to a lesser width than before.

Figure 3:
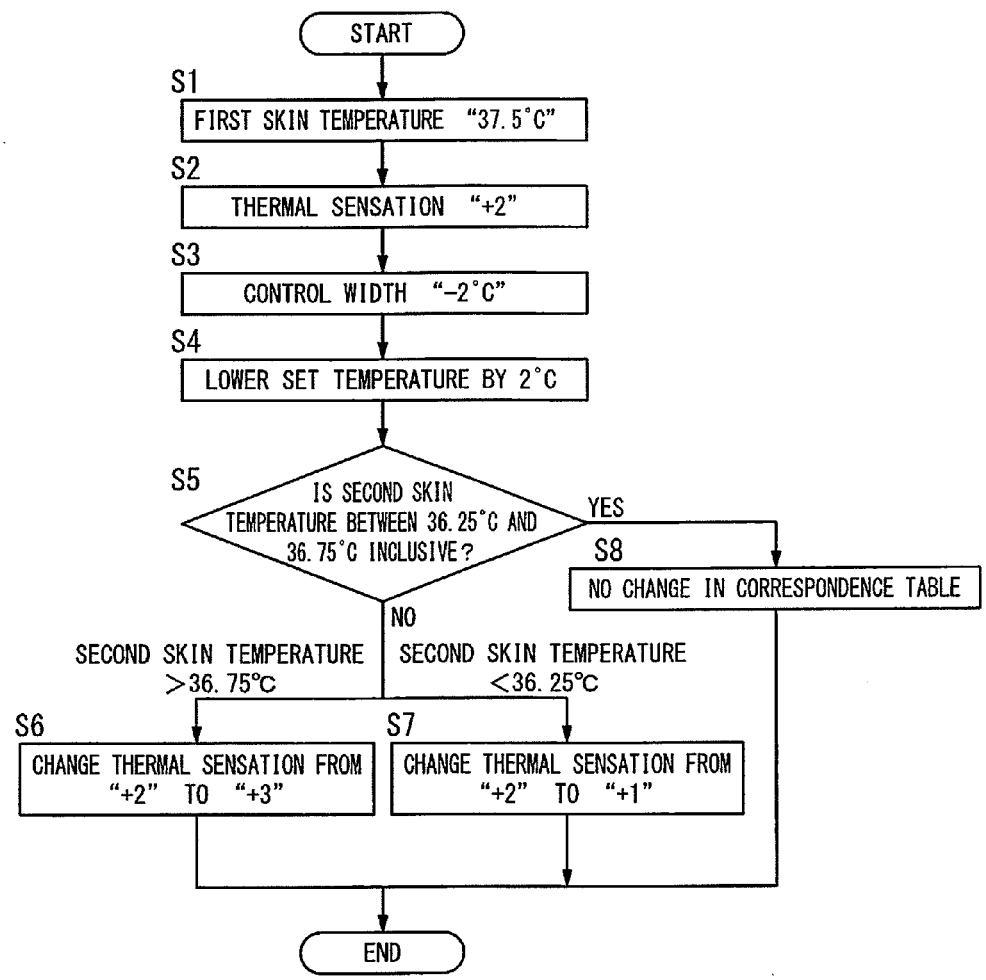
FIG. 3 is a flowchart illustrating operations of the apparatus control system according to the embodiment.

Such control of the heating-cooling combination apparatus 6 and the update of the correspondence table 4 will be described with reference to FIG. 3. Here, a case where the first skin temperature of the user 7 is "37.5° C." will be described. The skin temperature measurement device 2 measures the skin temperature of the user 7. Then, the measurement result of the skin temperature measurement device 2 is inputted to the input unit 32 of the apparatus control device 3 (S1). The apparatus control unit 33 extracts, from the correspondence table 4 (refer to FIG. 2) stored in the storage unit 31, the thermal sensation of "+2" that is associated with the first skin temperature of "37.5° C." and the control width of "−2° C." as the control content (S2 and S3). Thereafter, the apparatus control unit 33 outputs, to the heating-cooling combination apparatus 6, a control signal that includes a new set temperature that is lower than the current set temperature by 2° C. (S4). The heating-cooling combination apparatus 6 changes the set temperature to the temperature that is lower than the current set temperature by 2° C.

If the second skin temperature that is newly inputted in the predetermined time slot is not included in the comfortable temperature range ("NO" in S5) after the apparatus control unit 33 has controlled the heating-cooling combination apparatus 6, the apparatus control device 3 operates as follows. If the second skin temperature is higher than the upper limit value of the comfortable temperature range, the update unit 34 changes the thermal sensation that is associated with the first skin temperature of "37.5° C." in the correspondence table 4 from "+2" to "+3", and stores the correspondence table 4 after update in the storage unit 31 (S6). The control width associated with the first skin temperature of "37.5° C." thereby becomes "−3° C.". On the other hand, if the second skin temperature is lower than the lower limit value of the comfortable temperature range, the update unit 34 changes the thermal sensation that is associated with the first skin temperature of "37.5° C." in the correspondence table 4 from "+2" to "+1", and stores the correspondence table 4 after update in the storage unit 31 (S7). The control width associated with the first skin temperature of "37.5° C." thereby becomes "−1° C."

In step S5, if the second skin temperature that is newly inputted in the predetermined time slot is included in the comfortable temperature range after the apparatus control unit 33 has controlled the heating-cooling combination apparatus 6 ("YES" in S5), the correspondence table 4 remains stored in the storage unit 31 without being changed (S8).

Due to the above operations, the apparatus control device 3 can perform control in which the preference of the user 7 is reflected.

For example, when the control width associated with the first skin temperature of "37.5° C." is changed from "−2° C." to "−3° C.", the operations change as follows. Before the change of the control width, the apparatus control device 3 extracts the thermal sensation of "+2" and the control width of "−2° C." from the correspondence table 4. Then, the apparatus control device 3 controls the heating-cooling combination apparatus 6 such that the set temperature is lowered by 2° C. from the current value. In contrast, after the change of the control width, the apparatus control device 3 extracts a thermal sensation of "+3" and a control width of "−3° C." from the correspondence table 4. Then, the apparatus control device 3 controls the heating-cooling combination apparatus 6 such that the set temperature is lowered by 3° C. from the current value.

Incidentally, the apparatus control device 3 includes, as shown in FIG. 1, a communication unit 36 that is configured to communicate with the server 5 and a recognition unit 37 that recognizes the type of the user 7 relating to the thermal sensation. The types relating to the thermal sensation are predetermined, and include a "heat sensitive type", a person that feels hotter than the average person, and a "cold sensitive type", a person that feels colder than the average person, and the like. Also, a plurality of types may be determined according to the degree of sensitivity to cold.

The recognition unit 37 may recognize the type of the user 7 using an input by the user 7, or may recognize the type of the user 7 from history information of past set temperatures of the heating-cooling combination apparatus 6. Examples of an input device (not shown) used when the user 7 inputs the type of the user 7 include a keyboard, a plurality of operation buttons, and a touch panel.

The communication unit 36 is configured to transmit, to the server 5, the correspondence table 4 (refer to FIG. 2) that is updated by the update unit 34 and stored in the storage unit 31 and the type of the user 7 recognized by the recognition unit 37.

The server 5 includes a server-side communication unit 51 that is configured to communicate with the apparatus control device 3, a server-side storage unit 52 that is configured to store a plurality of correspondence tables 4, and a server-side control unit 53 that is configured to control the functions of the server 5.

The server-side communication unit 51 receives the correspondence table 4 that is customized for each user 7 by the apparatus control device 3 and the type of the user 7 from the apparatus control device 3.

The server-side storage unit 52 is configured to store, by type, the plurality of correspondence tables 4 received up to this point by the server-side communication unit 51. That is, the server-side storage unit 52 is configured to store, by type, the plurality of correspondence tables 4 that are customized up to this point for respective users 7 by the apparatus control device 3.

Also, the apparatus control device 3 can acquire the correspondence table 4 that is to be initially stored in the storage unit 31 from the server 5. This apparatus control device 3 further includes an acquisition unit 38 that is configured to acquire the correspondence table 4 from the server 5.

The acquisition unit 38 is configured to acquire the correspondence table 4 that is to be initially stored in the storage unit 31 from the server 5. On this occasion, the communication unit 36 transmits the type of the user 7 recognized by the recognition unit 37 to the server 5, and the acquisition unit 38 acquires the correspondence table 4 corresponding to the type of the user 7 recognized by the recognition unit 37 from the server 5.

In the server 5, the server-side control unit 53 is configured to execute the functions of a type acquisition unit and a selection unit that are described later. The server-side control unit 53 is configured to perform, as the function of the type acquisition unit, acquisition of the type of the user 7 recognized by the recognition unit 37 of the apparatus control device 3 from the apparatus control device 3 via the server-side communication unit 51. Also, the server-side control unit 53 is configured to perform, as the function of the selection unit, selection of the correspondence table 4 that is stored in the server-side storage unit 52 associated with the acquired type. The server-side communication unit 51 is configured to transmit the correspondence table 4 selected by the server-side control unit 53 to the apparatus control device 3.

Figure 4:
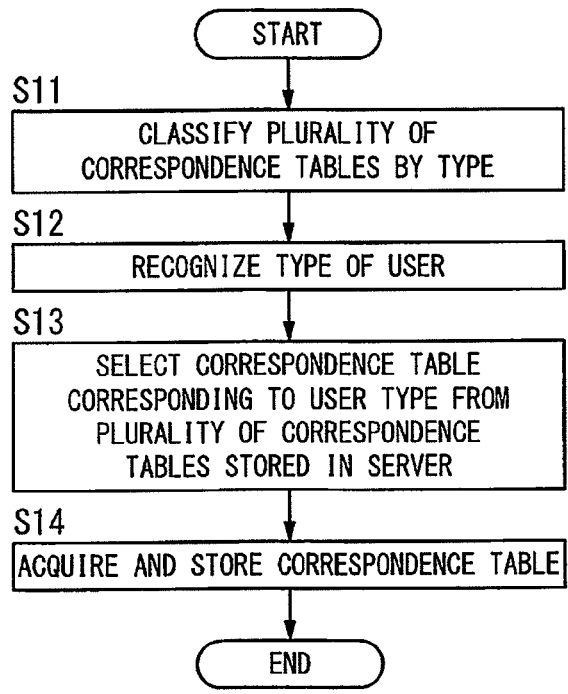
FIG. 4 is a flowchart illustrating initial operations of the apparatus control system according to the embodiment.

Such acquisition of the correspondence table 4 from the server 5 will be described with reference to FIG. 4. Firstly, the server 5 stores the plurality of correspondence tables 4, classified by type, that have been acquired up to this point from the apparatus control device 3 (S11). The apparatus control device 3 recognizes the type of the new user 7 (S12). Thereafter, the server 5 selects the correspondence table 4 corresponding to the type of the user 7 from among the plurality of correspondence tables 4 that are stored (S13). The apparatus control device 3 acquires, from the server 5, the correspondence table 4 corresponding to the type of the user 7 and stores the acquired correspondence table 4 (S14).

Due to such operations, the apparatus control device 3 can acquire, from the server 5, the correspondence table 4 appropriate for the type of the new user 7.

Incidentally, the relationship between the skin temperature of the user 7 and the thermal sensation of the user 7 is not necessarily the same all year around and changes according to weather conditions. Examples of the weather conditions of the present embodiment include the season and the outside air temperature. An average temperature of one day may be adopted as the outside air temperature, for example. For example, the thermal sensation of the user 7 often differs between spring and summer, even if the user 7 has the same skin temperature. Also, even if the user 7 has the same skin temperature in the same summer season, for example, the thermal sensation of the user 7 often differs between a period when it is extremely hot and a period when it is not so hot.

Figure 5:
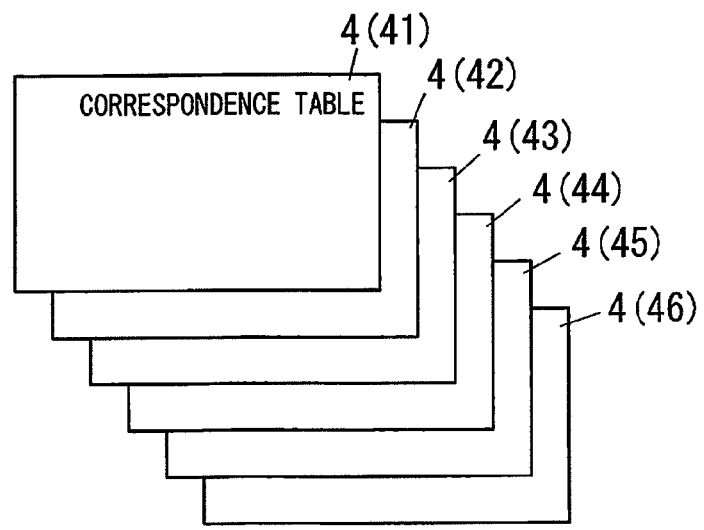
FIG. 5 is a diagram illustrating correspondence tables stored by weather condition according to the embodiment.

Therefore, the storage unit 31 is configured to store the correspondence tables 4 by weather condition, as shown in FIG. 5. In an example shown in FIG. 5, the storage unit 31 is configured to store a correspondence table 4 for each outside air temperature range. That is, the storage unit 31 is configured to store a correspondence table 41 corresponding to an outside air temperature range of less than 0° C., a correspondence table 42 corresponding to an outside air temperature range of 0° C. or more to less than 8° C., and a correspondence table 43 corresponding to an outside air temperature range of 8° C. or more to less than 16° C. Furthermore, the storage unit 31 is configured to store a correspondence table 44 corresponding to an outside air temperature range of 16° C. or more to less than 24° C., a correspondence table 45 corresponding to an outside air temperature range of 24° C. or more to less than 32° C., and a correspondence table 46 corresponding to an outside air temperature range of 32° C. or more. Also, the storage unit 31 is configured to store, by season, combinations of the plurality of correspondence tables 41 to 46 stored for each outside air temperature range.

The apparatus control device 3 further includes, as shown in FIG. 1, an outside air temperature acquisition unit 39 that is configured to acquire temperature information relating to the current outside air temperature. The outside air temperature acquisition unit 39 may be an outside air temperature measurement means (temperature sensor, for example) that is provided outside and configured to measure the current outside air temperature, or an outside air temperature input means that is configured to receive input of outside air temperature information. Examples of the outside air temperature input means include a means that is configured to receive the outside air temperature information from an external device (not shown), or a means that is configured to acquire the outside air temperature information due to the user 7 inputting the current outside air temperature. Examples of the input device (not shown) used by the user 7 for inputting the current outside air temperature include a keyboard, a plurality of operation buttons, and a touch panel.

The apparatus control unit 33 is configured to select a correspondence table 4 (refer to FIG. 5) corresponding to the range that includes the outside air temperature acquired by the outside air temperature acquisition unit 39, and extract the control content associated with the first skin temperature of the user 7 from the selected correspondence table 4.

Incidentally, the storage unit 31 of the apparatus control device 3 not only stores the correspondence table 4, but also stores a program for the apparatus control device (computer) 3 to execute various functions. That is to say, the storage unit 31 is configured to store a program for causing the apparatus control device 3 to function as the storage unit 31, the input unit 32, the apparatus control unit 33, the update unit 34, the clocking unit 35, the communication unit 36, the recognition unit 37, the acquisition unit 38, and the outside air temperature acquisition unit 39. The above-described program is pre-stored in the storage unit 31 at the time of shipping the apparatus control device 3. However, in a case where the apparatus control device 3 acquires the above program after shipment, an example of a method for acquiring the above program is to use a computer-readable recording medium in which the above program is recorded. In the case of the method using the recording medium, the apparatus control device 3 may include a reading device (not shown) to read data in the recording medium. Examples of the recording medium include an optical disk and a memory card. Examples of the reading device include a drive device configured to read out information of the optical disk, and a memory card reader configured to read out information of the memory card. Similarly, another method for the apparatus control device 3 to acquire the above program is to download the above program from another device (server 5, for example) using a network. In the case of the method in which the above program is downloaded, the apparatus control device 3 may include a communication function for communicating with another device using the network.

In the apparatus control system 1 according to the present embodiment as described above, the apparatus control unit 33 in the apparatus control device 3 refers to the correspondence table 4 (correspondence relationship), and controls the heating-cooling combination apparatus 6 according to the control content associated with the first skin temperature included in the measurement result of the skin temperature measurement device 2. Accordingly, the intention of the user 7 regarding the thermal environment can be reflected in the control of the heating-cooling combination apparatus 6 while making a remote controller operation by the user 7 unnecessary.

Also, in the apparatus control system 1 according to the present embodiment, after the apparatus control unit 33 has controlled the heating-cooling combination apparatus 6 according to the control content, if the second skin temperature that is newly inputted to the input unit 32 is not included in the comfortable temperature range, the update unit 34 updates the correspondence table 4 stored in the storage unit 31. On this occasion, the update unit 34 changes the control content in the correspondence table 4 such that over-control or under-control according to the control content is reduced. Accordingly, the preference of the user 7 can be reflected in the control of the heating-cooling combination apparatus 6 while making a remote controller operation by the user 7 unnecessary.

Furthermore, in the apparatus control system 1 according to the present embodiment, since the correspondence table 4 that has been customized for each user 7 up to this point is stored in the server 5, a new user 7 can use one of the correspondence tables 4 stored in the server 5 as a default. Due to using the correspondence table 4 already customized, the correspondence between skin temperatures and control contents (including the correspondence between skin temperatures and thermal sensations) can be approximated more closely to reality.

Also, since the server 5 according to the present embodiment stores the correspondence tables 4 by types relating to the thermal sensation, the apparatus control device 3 can acquire the correspondence table 4 appropriate for the type of the user 7 from the server 5, when initially storing the correspondence table 4 in the storage unit 31.

Furthermore, in the apparatus control system 1 according to the present embodiment, due to storing the correspondence tables 4 in the storage unit 31 by weather condition, the heating-cooling combination apparatus 6 can be controlled taking the weather condition into consideration.

Also, since the skin temperature measurement device 2 is provided in a terminal separate from the apparatus control device 3, a general-purpose terminal having a skin temperature measurement function can be used as the skin temperature measurement device 2, for example, and as a result the initial cost of the system can be reduced.

Although the present invention has been described with reference to a certain preferred embodiment, numerous modifications and variations can be made by those skilled in the art without departing from the true spirit and scope of this invention, namely claims.

The invention claimed is:

1. An apparatus control device comprising a processor and a memory for controlling a heating-cooling combination apparatus, the apparatus control device is used together with a skin temperature measurement device, the apparatus control device comprising:
   a storage unit configured to store correspondence relationships between skin temperatures and control contents of the heating-cooling combination apparatus;
   an input unit configured to receive input of the skin temperature;
   an apparatus control unit configured to control the heating-cooling combination apparatus according to a control content stored in the storage unit associated with a first skin temperature that is inputted to the input unit; and
   an update unit configured to update the control content associated with the first skin temperature stored in the storage unit,
   wherein, when a second skin temperature that is newly inputted to the input unit after the apparatus control unit has controlled the heating-cooling combination apparatus according to the control content associated with the first skin temperature is not included in a predetermined comfortable temperature range, the update unit updates the control content associated with the first skin temperature stored in the storage unit such that over-control or under-control of the heating-cooling combination apparatus is reduced when the apparatus control unit controls the heating-cooling combination apparatus according to the updated control content stored in the storage unit associated with the second skin temperature.

2. The apparatus control device according to claim 1, further comprising an acquisition unit configured to acquire the correspondence relationships that are to be initially stored in the storage unit from a server.

3. The apparatus control device according to claim 2, further comprising a recognition unit configured to recognize a type of user out of a plurality of predetermined types relating to a thermal sensation, wherein the server is configured to store the correspondence relationships by type, and wherein the acquisition unit is configured to acquire the correspondence relationship corresponding to the type recognized by the recognition unit from the server.

4. The apparatus control device according to claim 1, wherein the storage unit is configured to store a correspondence relationship for each weather condition.

5. The apparatus control device according to claim 1, wherein the control content is a control width designating a temperature width that is to be added to or subtracted from a set temperature of the heating-cooling combination apparatus, and the update unit: increases the control width associated with the first skin temperature in the correspondence relationship to a greater width than before, when the second skin temperature is higher than an upper limit value of the comfortable temperature range after the apparatus control unit has controlled the heating-cooling combination apparatus so as to lower the set temperature, decreases the control width associated with the first skin temperature in the correspondence relationship to a lesser width than before, when the second skin temperature is lower than a lower limit value of the comfortable temperature range after the apparatus control unit has controlled the heating-cooling combination apparatus so as to lower the set temperature, increases the control width associated with the first skin temperature in the correspondence relationship to a greater width than before, when the second skin temperature is lower than the lower limit value of the comfortable temperature range after the apparatus control unit has controlled the heating-cooling combination apparatus so as to raise the set temperature, and decreases the control width associated with the first skin temperature in the correspondence relationship to a lesser width than before, when the second skin temperature is higher than the upper limit value of the comfortable temperature range after the apparatus control unit has controlled the heating-cooling combination apparatus so as to raise the set temperature.

6. An apparatus control system comprising:
the apparatus control device according to claim 1; and
the skin temperature measurement device configured to measure the skin temperature.

7. The apparatus control system according to claim 1, wherein the skin temperature measurement device is provided in a terminal separate from the apparatus control device.

8. A non-transitory computer-readable recording medium containing a program for causing a computer to function as:
a storage unit configured to store correspondence relationships between skin temperatures and control contents of a heating-cooling combination apparatus;
an input unit configured to receive input of a skin temperature;
an apparatus control unit configured to control the heating-cooling combination apparatus according to a control content stored in the storage unit associated with a first skin temperature that is inputted to the input unit; and
an update unit configured to update the control content associated with the first skin temperature stored in the storage unit, wherein when a second skin temperature that is newly inputted to the input unit after the apparatus control unit has controlled the heating-cooling combination apparatus according to the control content associated with the first skin temperature is not included in a predetermined comfortable temperature range, the update unit updates the control content associated with the first skin temperature stored in the storage unit such that over-control or under-control of the heating-cooling combination apparatus is reduced when the apparatus control unit controls the heating-cooling combination apparatus according to the updated control content stored in the storage unit associated with the second skin temperature.

9. The apparatus control device according to claim 2, wherein the storage unit is configured to store a correspondence relationship for each weather condition.

10. The apparatus control device according to claim 3, wherein the storage unit is configured to store a correspondence relationship for each weather condition.

11. The apparatus control device according to claim 2, wherein the control content is a control width designating a temperature width that is to be added to or subtracted from a set temperature of the heating-cooling combination apparatus, and the update unit: increases the control width associated with the first skin temperature in the correspondence relationship to a greater width than before, when the second skin temperature is higher than an upper limit value of the comfortable temperature range after the apparatus control unit has controlled the heating-cooling combination apparatus so as to lower the set temperature, decreases the control width associated with the first skin temperature in the correspondence relationship to a lesser width than before, when the second skin temperature is lower than a lower limit value of the comfortable temperature range after the apparatus control unit has controlled the heating-cooling combination apparatus so as to lower the set temperature, increases the control width associated with the first skin temperature in the correspondence relationship to a greater width than before, when the second skin temperature is lower than the lower limit value of the comfortable temperature range after the apparatus control unit has controlled the heating-cooling combination apparatus so as to raise the set temperature, and decreases the control width associated with the first skin temperature in the correspondence relationship to a lesser width than before, when the second skin temperature is higher than the upper limit value of the comfortable temperature range after the apparatus control unit has controlled the heating-cooling combination apparatus so as to raise the set temperature.

12. The apparatus control device according to claim 3, wherein the control content is a control width designating a temperature width that is to be added to or subtracted from a set temperature of the heating-cooling combination apparatus, and the update unit: increases the control width associated with the first skin temperature in the correspondence relationship to a greater width than before, when the second skin temperature is higher than an upper limit value of the comfortable temperature range after the apparatus control unit has controlled the heating-cooling combination apparatus so as to lower the set temperature, decreases the control width associated with the first skin temperature in the correspondence relationship to a lesser width than before, when the second skin temperature is lower than a lower limit value of the comfortable temperature range after the apparatus control unit has controlled the heating-cooling combination apparatus so as to lower the set temperature, increases the control width associated with the first skin temperature in the correspondence relationship to a greater width than before, when the second skin temperature is lower than the lower limit value of the comfortable temperature range after the apparatus control unit has controlled the heating-cooling combination apparatus so as to raise the set temperature, and decreases the control width associated with the first skin temperature in the correspondence relationship to a lesser width than before, when the second skin temperature is higher than the upper limit value of the comfortable temperature range after the apparatus control unit has controlled the heating-cooling combination apparatus so as to raise the set temperature.

13. The apparatus control device according to claim 4, wherein the control content is a control width designating a temperature width that is to be added to or subtracted from a set temperature of the heating-cooling combination apparatus, and the update unit: increases the control width associated with the first skin temperature in the correspondence relationship to a greater width than before, when the second skin temperature is higher than an upper limit value of the comfortable temperature range after the apparatus control unit has controlled the heating-cooling combination apparatus so as to lower the set temperature, decreases the control width associated with the first skin temperature in the correspondence relationship to a lesser width than before, when the second skin temperature is lower than a lower limit value of the comfortable temperature range after the apparatus control unit has controlled the heating-cooling combination apparatus so as to lower the set temperature, increases the control width associated with the first skin temperature in the correspondence relationship to a greater width than before, when the second skin temperature is lower than the lower limit value of the comfortable temperature range after the apparatus control unit has controlled the heating-cooling combination apparatus so as to raise the set temperature, and decreases the control width associated with the first skin temperature in the correspondence relationship to a lesser width than before, when the second skin temperature is higher than the upper limit value of the comfortable temperature range after the apparatus control unit has controlled the heating-cooling combination apparatus so as to raise the set temperature.

14. The apparatus control device according to claim 9, wherein the control content is a control width designating a temperature width that is to be added to or subtracted from a set temperature of the heating-cooling combination apparatus, and the update unit: increases the control width associated with the first skin temperature in the correspondence relationship to a greater width than before, when the second skin temperature is higher than an upper limit value of the comfortable temperature range after the apparatus control unit has controlled the heating-cooling combination apparatus so as to lower the set temperature, decreases the control width associated with the first skin temperature in the correspondence relationship to a lesser width than before, when the second skin temperature is lower than a lower limit value of the comfortable temperature range after the apparatus control unit has controlled the heating-cooling combination apparatus so as to lower the set temperature, increases the control width associated with the first skin temperature in the correspondence relationship to a greater width than before, when the second skin temperature is lower than the lower limit value of the comfortable temperature range after the apparatus control unit has controlled the heating-cooling combination apparatus so as to raise the set temperature, and decreases the control width associated with the first skin temperature in the correspondence relationship to a lesser width than before, when the second skin temperature is higher than the upper limit value of the comfortable temperature range after the apparatus control unit has controlled the heating-cooling combination apparatus so as to raise the set temperature.

15. The apparatus control device according to claim 10, wherein the control content is a control width designating a temperature width that is to be added to or subtracted from a set temperature of the heating-cooling combination apparatus, and the update unit: increases the control width associated with the first skin temperature in the correspondence relationship to a greater width than before, when the second skin temperature is higher than an upper limit value of the comfortable temperature range after the apparatus control unit has controlled the heating-cooling combination apparatus so as to lower the set temperature, decreases the control width associated with the first skin temperature in the correspondence relationship to a lesser width than before, when the second skin temperature is lower than a lower limit value of the comfortable temperature range after the apparatus control unit has controlled the heating-cooling combination apparatus so as to lower the set temperature, increases the control width associated with the first skin temperature in the correspondence relationship to a greater width than before, when the second skin temperature is lower than the lower limit value of the comfortable temperature range after the apparatus control unit has controlled the heating-cooling combination apparatus so as to raise the set temperature, and decreases the control width associated with the first skin temperature in the correspondence relationship to a lesser width than before, when the second skin temperature is higher than the upper limit value of the comfortable temperature range after the apparatus control unit has controlled the heating-cooling combination apparatus so as to raise the set temperature.

16. An apparatus control system comprising:
the apparatus control device according to claim 2; and
the skin temperature measurement device configured to measure the skin temperature.

17. An apparatus control system comprising:
the apparatus control device according to claim 3; and
the skin temperature measurement device configured to measure the skin temperature.

18. An apparatus control system comprising:
the apparatus control device according to claim 4; and
the skin temperature measurement device configured to measure the skin temperature.

19. An apparatus control system comprising:
the apparatus control device according to claim 5; and
the skin temperature measurement device configured to measure the skin temperature.

20. The apparatus control system according to claim 16, wherein the skin temperature measurement device is provided in a terminal separate from the apparatus control device.

* * * * *